United States Patent
Baba et al.

(10) Patent No.: US 7,223,492 B2
(45) Date of Patent: May 29, 2007

(54) LAMINATED STRUCTURE OF FLAT PLATE TYPE SOLID OXIDE FUEL CELL

(75) Inventors: Yoshitaka Baba, Tokyo (JP); Yoshio Matsuzaki, Tokyo (JP); Isamu Yasuda, Tokyo (JP)

(73) Assignee: Tokyo Gas Co., Ltd., Tokyo (JP)

( * ) Notice: Subject to any disclaimer, the term of this patent is extended or adjusted under 35 U.S.C. 154(b) by 636 days.

(21) Appl. No.: 10/472,999

(22) PCT Filed: May 13, 2002

(86) PCT No.: PCT/JP02/04602

§ 371 (c)(1),
(2), (4) Date: Sep. 24, 2003

(87) PCT Pub. No.: WO02/093671

PCT Pub. Date: Nov. 21, 2002

(65) Prior Publication Data

US 2004/0110055 A1 Jun. 10, 2004

(30) Foreign Application Priority Data

May 14, 2001 (JP) .............................. 2001-144034

(51) Int. Cl.
*H01M 2/14* (2006.01)
(52) U.S. Cl. .......................... 429/38; 429/39; 429/129; 429/131; 429/132; 429/247

(58) Field of Classification Search .................. 429/38, 429/39, 129, 131, 132, 247
See application file for complete search history.

(56) References Cited

FOREIGN PATENT DOCUMENTS

| JP | 54-37954 | 3/1979 |
|----|----------|--------|
| JP | 5-29001 | 2/1993 |
| JP | 5-109415 | 4/1993 |
| JP | 6-29034 | 2/1994 |
| JP | 6-168729 | 6/1994 |
| JP | 7-166301 | 6/1995 |
| JP | 7-282821 | 10/1995 |
| JP | 8-88018 | 4/1996 |
| JP | 9-161835 | 6/1997 |

*Primary Examiner*—Bruce F. Bell
(74) *Attorney, Agent, or Firm*—Flynn, Thiel, Boutell & Tanis, P.C.

(57) ABSTRACT

A laminated structure of a flat plate type solid oxide fuel cell is made up of an alloy metal separator having a flat plate and a slit plate, wherein the flat plate is brought into contact with the slit plate after the slit plate is brought into contact with an air pole or the air pole is brought into contact with the slit plate after the slit plate is brought into contact with the flat plate, whereby a problem with the working of the alloy metal separator can be eliminated, and also the excellent performance of the flat plate type solid oxide fuel cell can be maintained by using the separator.

16 Claims, 9 Drawing Sheets

FIG. 9

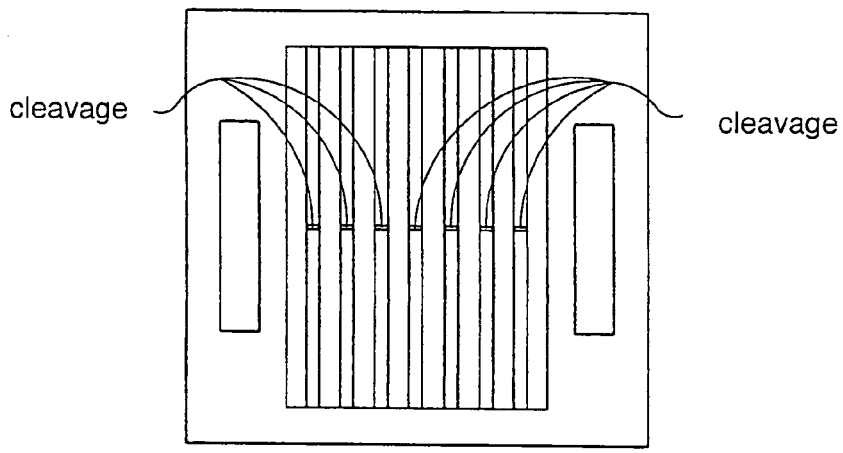

an example wherein a cleavage for each of the latticed strips is provided so as to be disposed at the center of the respective latticed strips, in the longitudinal direction there of

FIG. 10

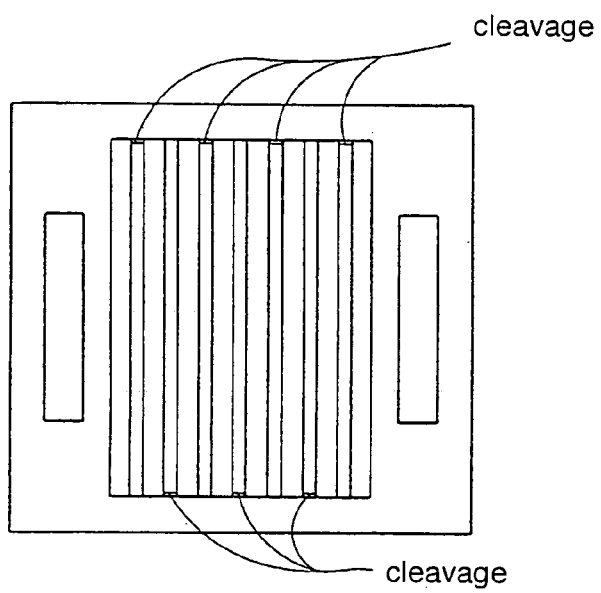

an example wherein a cleavage for each of the latticed strips is provided so as to be disposed at the upper end and lower end, alternately, of the latticed strips adjacent to each other, in the longitudinal direction thereof, respectively, (in a staggered manner)

FIG. 11

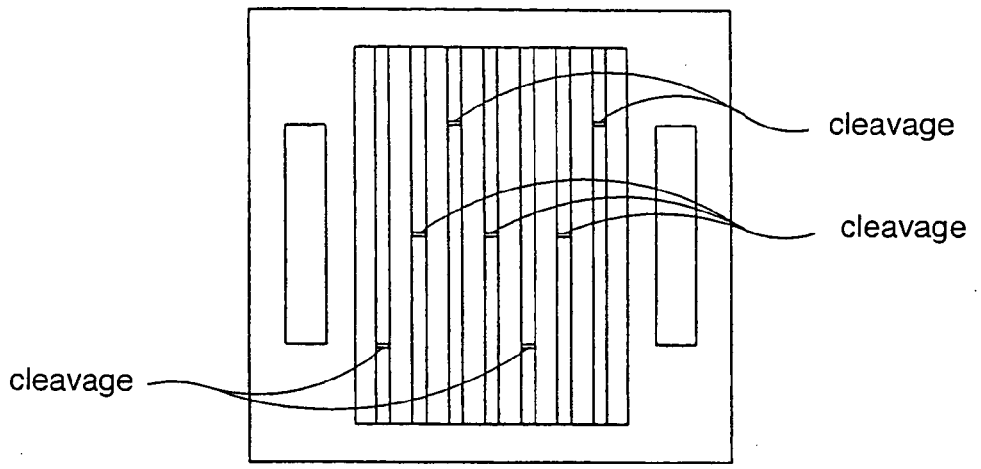

an example 1 wherein a cleavage for each of the latticed strips is provided so as to be disposed at any suitable position of every one of the latticed strips, in the longitudinal direction thereof

FIG. 12

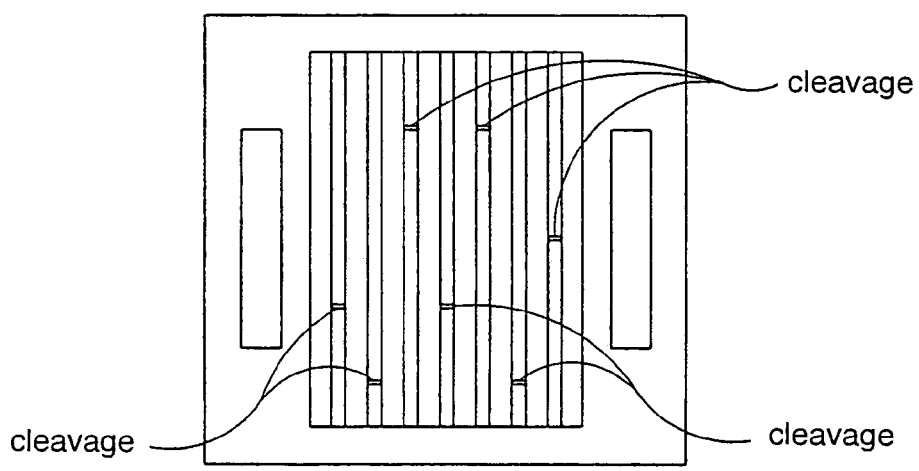

an example 2 wherein a cleavage for each of the latticed strips is provided so as to be disposed at any suitable position of every one of the latticed strips, in the longitudinal direction thereof

LAMINATED STRUCTURE OF FLAT PLATE TYPE SOLID OXIDE FUEL CELL

FIELD OF THE INVENTION

The present invention relates to a laminated structure of a flat plate type solid oxide fuel cell, and more specifically, to a laminated structure of a flat plate type solid oxide fuel cell, comprising a separator made of an alloy, and the separator made of the alloy for use therein.

BACKGROUND OF THE INVENTION

There are various types of fuel cells that are differentiated from each other by an ionic conductor, that is, a substance used as an electrolyte, and a solid oxide type fuel cell, SOFC (Solid Oxide Fuel Cell); herein referred to also as "a solid oxide fuel cell", is a fuel cell using an oxide for a solid electrolytic material having ionic conductivity. This fuel cell generally has an operation temperature as high as on the order of 1000° C., however, there has lately been developed one having an operation temperature not higher than about 750° C. The solid oxide type fuel cell has the following features described under items (1) through (5) below:

(1) Because the electrochemical reaction at the electrodes proceeds smoothly due to a high operation temperature, the energy loss is low and power generation efficiency is high.

(2) Since the temperature of the waste heat is high, the power generation efficiency can be enhanced still higher by the multi-stage utilization of the waste heat.

(3) Since the operation temperature is high enough to cause hydrocarbon fuels such as natural gas to be reformed, it is possible to cause a reformation reaction to occur inside the fuel cell. In this respect, it is possible to implement substantial simplification of a fuel processing system (a reformer plus a shift converter) required in a low-temperature operation type fuel cell such as a phosphoric acid fuel cell, and polymer fuel cell.

(4) As it is possible to cause carbon monoxide (CO) as well to contribute to the power generation reaction, the fuel can be diversified.

(5) Since all constituent members are made up of solids, respectively, there is no risk of problems such as corrosion and evaporation of an electrolyte, occurring to a phosphoric acid fuel cell and molten carbonate fuel cell.

FIGS. 1 and 2 are schematic representations illustrating a form of a solid oxide type fuel cell by way of example. As shown in the figures, a fuel pole or anode and an air pole or cathode (an oxide pole in the case of oxygen being used as an oxidizing agent) are disposed with an electrolytic material sandwiched therebetween, and a single cell is made up of a triple-layer unit of fuel pole/electrolyte/air pole. For the electrolytic material, use is made of, for example, a sintered body in a sheet form, made of yttria-stabilized zirconia (YSZ), and so forth. For the fuel pole, use is made of, for example, a porous material made from a mixture of nickel and yttria-stabilized zirconia (Ni–YSZ cermet), and so forth. For the air pole, use is made of, for example, a porous material made from Sr-doped $LaMnO_3$, and so forth. The single cell is made up normally by causing the fuel pole and the air pole to be backed into both-side faces of the electrolytic material.

When operating the solid oxide type fuel cell described above, fuel is fed to the fuel pole side of the single cell while air as an oxidizing agent is fed to the air pole side of the single cell, and by connecting both the poles to an external load, electric power can be obtained. However, with only one single cell, a voltage at only on the order of 0.7 V at most is obtained. Accordingly, it is necessary for obtaining electric power for practical use to connect a plurality of the single cells with each other in series.

For the purpose of electrically connecting adjacent single cells with each other; and properly distributing, and supplying fuel and air to the fuel pole and the air pole, respectively, at the same time, before discharging them, a separator (inter-connector) and the single cell are alternately laminated to each other. FIGS. 1 and 2 show a case where there are provided two single cells, with one separator interposed therebetween, and a frame body (serving as a kind of separator) is disposed on the upper surface of an upper single cell, and on the underside of a lower single cell, respectively.

FIG. 3 is a schematic representation illustrating a process of constructing a solid oxide type fuel cell using the separator described. As shown in FIG. 3, a current collector plate is disposed on the surface of the separator disposed on the underside of the fuel pole (Ni+YSZ), and on the upper surface of the separator disposed on top of the air pole, respectively, and by imposing a load from the current collector plate disposed on the upper surface of the separator disposed on top of the air pole, respective members are closely laminated with each other. In FIG. 3, there is shown a case where one single cell made up of the triple-layer unit is used, however, the same applies to a case where a plurality of single cells are disposed so as to be laminated to each other.

With reference to the separators to be used as described above, numerous properties as described under items (1) through (8) are required:

(1) dense enough not to allow gas to pass, and to leak therethrough;

(2) electron conductivity is high;

(3) ionic conductivity is low enough to be negligible;

(4) the constituent material itself is chemically stable in both an oxidizing atmosphere and a reducing atmosphere at a high temperature;

(5) there occurs no reaction thereof with other constituent members such as the two poles, and no excessive mutual diffusion therewith;

(6) the thermal expansion coefficient thereof matches those of other constituent materials of the cell;

(7) changes in size, due to a variation in atmosphere, are small; and (8) sufficient strength.

Because of such severe requirements, there is a limitation to the constituent material that can be used as the separator under an operating condition close to 1000° C. As a constituent material meeting those requirements as much as possible, use is most generally made of an oxide solid solution of a $LaCrO_3$ group (lanthanum chromite). With the constituent material described, a portion of the La is replaced with an alkaline earth metal such as Ca, Sr, etc., and further, a portion of the Cr is replaced with a 3d transition metal element such as Mg, Co, Mn, Ni, etc., thereby optimizing the properties thereof so as to meet those described requirements.

Now, with the solid oxide type fuel cell operating at a temperature not higher than about 750° C., there has been proposed the use of an alloy such as a heat-resistant alloy containing chromium as the constituent material for the separator. Even in the case of such a material for use in the separator as described, the separator is naturally provided with grooves to allow the passage of air and fuel.

FIG. 4 is a schematic representation illustrating the construction of the conventional separator described as above by way of example. As shown in FIG. 4, there is the need for providing a plate body with a plurality of grooves, and machining is essential for forming such grooves in an alloy such as the heat-resistant alloy containing chromium. Machining of the alloy described, however, is very difficult because the alloy has a high hardness and partial cutting is required, eventually resulting in a high cost. This point poses a problem in putting it to commercial use. Further, since the metal (alloy) has a high thermal expansion coefficient in comparison with a cell made of a ceramic, use of a separator made of a metal causes stress to occur to a cell due to the rise and fall in temperature, posing a problem of breakage occurring to the cell.

In view of the fact and problems as described above in connection with the flat plate type solid oxide fuel cell, the invention has been developed in order to resolve those problems. It is therefore an object of the invention not only to eliminate the above-described problem with the processing and the problem of thermal stress cracking by introducing a novel idea to the separator made of the alloy, such as the heat-resistant alloy containing chromium, for use in the flat plate type solid oxide fuel cell but also to provide a laminated structure of a flat plate type solid oxide fuel cell, having excellent performance, in terms of performance as the flat plate type solid oxide fuel cell using the separator, and the separator to enable the object to be attained.

SUMMARY OF THE INVENTION

Thus, in accordance with a first aspect of the invention, there is provided a laminated structure of a flat plate type solid oxide fuel cell using a separator made of an alloy, wherein the separator comprises a flat plate and a slit plate and the slit plate is butted against an air pole before the flat plate is butted against the slit plate or the slit plate is butted against the flat plate before the air pole is butted against the slit plate.

The invention further provides a laminated structure of a flat plate type solid oxide fuel cell with these features, wherein a metallic holding sheet joined to a thin-film electrolyte with a sealant and so forth is disposed around the air pole, thereby alleviating an effect of thermal stress.

The invention still further provides a laminated structure of a flat plate type solid oxide fuel cell with these features, wherein a load is divided and respective loads are imposed on a seal section and current collecting section, individually.

The invention provides in its second aspect a separator made of an alloy, for use in a flat plate type solid oxide fuel cell, wherein the separator is made up of a flat plate and a slit plate, prepared individually.

The invention further provides a separator made of an alloy, for use in a flat plate type solid oxide fuel cell, with these features, wherein the slit plate is a slit plate having a cleavage provided in respective latticed strips forming slits, and in such a manner as to run in the direction crossing the longitudinal direction of the respective latticed strips.

BRIEF DESCRIPTION OF THE DRAWINGS

FIG. 9 is a schematic representation illustrating an example wherein a cleavage is provided in each of a plurality of latticed strips constituting respective slits of a slit section, according to Example 2;

FIG. 10 is a schematic representation illustrating another example wherein a cleavage is provided in each of the plurality of latticed strips constituting the respective slits of the slit section, according to Example 2;

FIG. 11 is a schematic representation illustrating still another example wherein a cleavage is provided in each of the plurality of latticed strips constituting the respective slits of the slit section, according to Example 2;

FIG. 12 is a schematic representation illustrating a further example wherein a cleavage is provided in each of the plurality of latticed strips constituting the respective slits of the slit section, according to Example 2;

PREFERRED EMBODIMENTS OF THE INVENTION

The present invention is concerned with a laminated structure of a flat plate type solid oxide fuel cell using a separator made of an alloy. With the present invention, it is important that the separator is made up of a flat plate and a slit plate, prepared individually, and such a constitution represents the basic feature of the invention. The laminated structure is made up by butting the slit plate against an air pole before butting a flat plate against the slit plate or by butting the silt plate against the flat plate before butting the air pole against the slit plate. FIGS. 5 and 6 are schematic representations illustrating an embodiment of the invention.

Figure 5A:
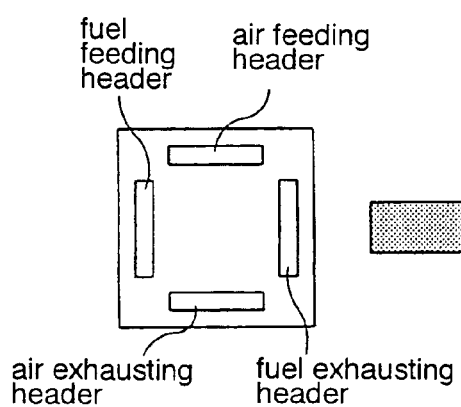
FIGS. 5(A) and (B) are schematic representations illustrating a flat plate of an embodiment of a separator according to the invention.
Figure 5B:
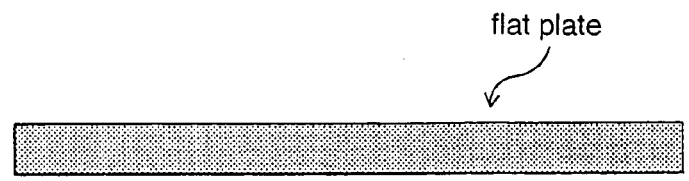
Figure 6A:
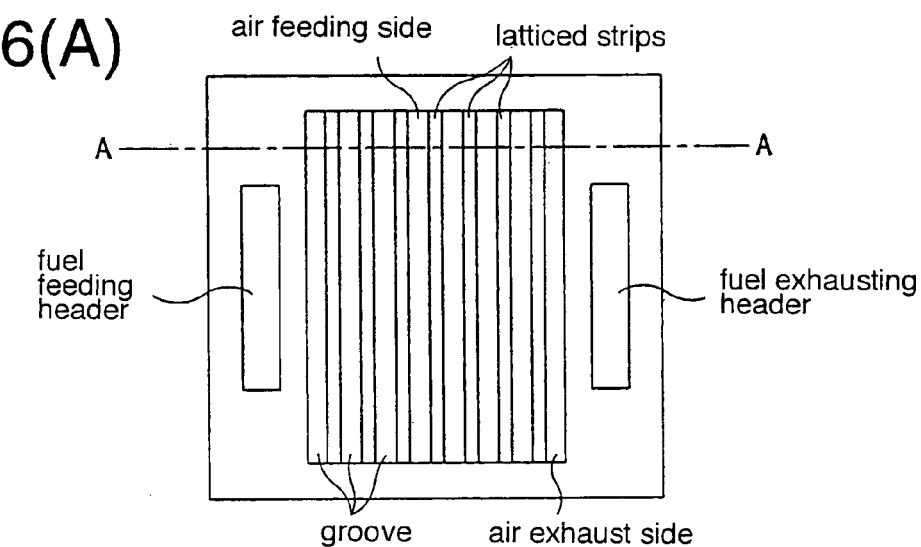
FIGS. 6(A) and (B) are schematic representations illustrating a slit plate of the embodiment of the separator according to the invention.
Figure 6B:
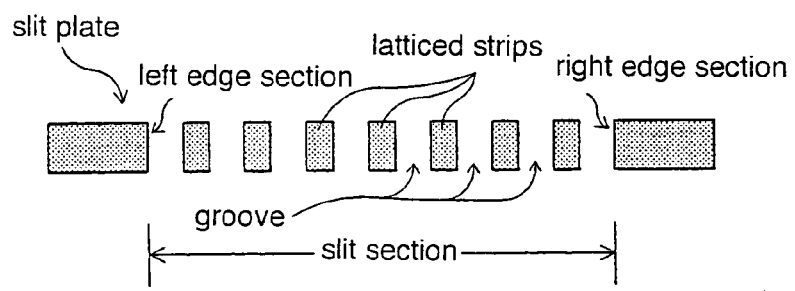

FIG. 5 is a view showing the flat plate, FIG. 5(A) being a plan view, and FIG. 5(B) a side view. In FIG. 5(B), the flat plate is shown larger than in FIG. 5(A). As shown in FIG. 5(A), the flat plate is provided simply with an air feeding header/air exhausting header and fuel feeding header/fuel exhausting header, which can be easily formed by punching. FIG. 6 is a view showing the slit plate, FIG. 6(A) being a plan view, and FIG. 6(B) a sectional view taken on line A—A in FIG. 6(A). In FIG. 6(B), the slit plate is shown somewhat larger than in FIG. 6(A). As shown in FIG. 6, the slit plate is provided simply with a plurality of slits cut through the slit plate vertically, that is, grooves, and the fuel feeding header/fuel exhausting header, which can be easily formed by punching. Respective slits are formed in such a manner as to be interposed between adjacent latticed strips of a plurality of the latticed strips, and the leftmost slit is formed between the left edge section of the slit plate and the leftmost latticed strip while the rightmost slit is formed between the right edge section of the slit plate and the rightmost latticed strip. The number of the slits (or the number of the latticed strips) are set as appropriate depending on the scale of a fuel cell and other conditions. The thickness of the flat plate combined with the slit plate is the same as that of a conventional integral type separator, however, since the flat plate and the slit plate are separately formed so as to meet such a requirement, the thickness of the flat plate and the slit plate, respectively, is thinner.

With the invention, not only is working on the separator rendered easier but also a fuel cell using the separator can maintain an excellent performance. In this respect, in the case of the conventional separator, since it has been necessary to provide a plate body with a plurality of grooves, machining by partial cutting has been essential. In contrast, with the invention, not only such a necessity is eliminated, but the fuel cell constructed by laminating by use of the separator is capable of maintaining its excellent properties in terms of performance.

Figure 7:
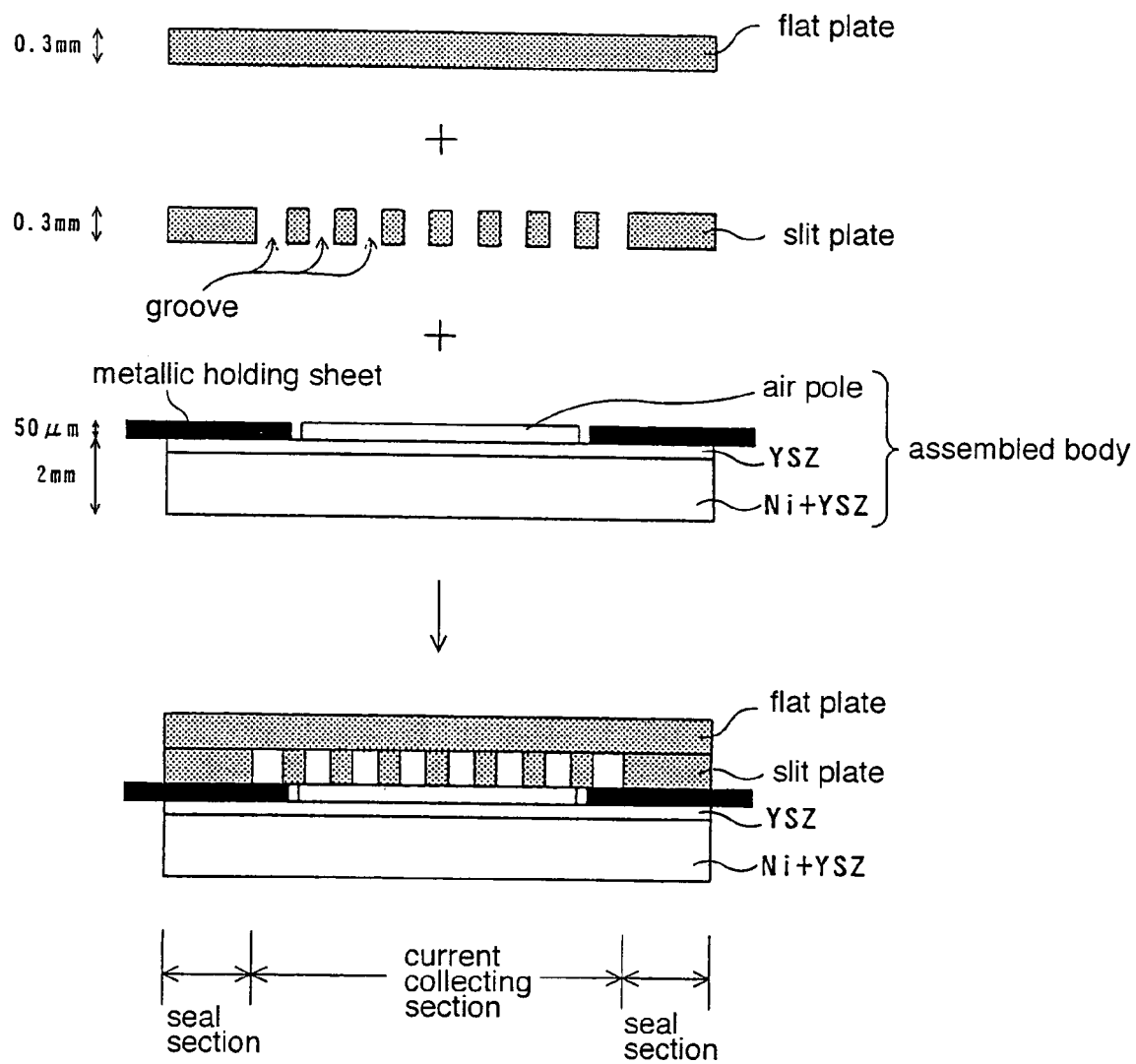
FIG. 7 is a schematic representation showing an example of a process of forming a flat plate type solid oxide fuel cell stack using the separator comprising the flat plate and the slit plate according to the invention.

FIG. 7 is a schematic representation showing an example of a process of forming a flat plate type solid oxide fuel cell stack using the separator comprising the flat plate and the slit plate according to the invention. In FIG. 7, sizes are shown by way of example, and are to be set as appropriate depending on the scale of the fuel cell and other conditions. A solid oxide electrolytic material {YSZ (yttria-stabilized zirconia) etc.} is disposed on top of a fuel pole {(Ni–YSZ cermet) etc.}, thereby forming a fuel pole holding a film-type cell. Subsequently, an air pole is disposed on a portion of the solid oxide electrolytic material, inside a frame of a thin metallic holding sheet (for example, 50 μm) in thickness. That is, the air pole is disposed so as to be surrounded with the frame of the metallic holding sheet. As for the metallic holding sheet, the sheet is disposed around the air pole. For the constituent material of the metallic holding sheet, a Fe—Cr based alloy, and so forth are used.

Thereafter, the separator according to the invention, comprising the flat plate and the slit plate, each formed individually, is disposed on top of an assembled body described as above, that is, on top of the air pole and the frame of the metallic holding sheet, surrounding the air pole. For implementing this, after the slit plate is first disposed on top of the assembled body, the flat plate is disposed. The current collecting function of the air pole and flow paths of air are thus provided by combination of the single slit plate made of an alloy and the single flat plate made of an alloy. Further, for alleviation of thermal stress, the metallic holding sheet is disposed around the air pole. As shown in the lower part in FIG. 7, with a laminated body made up as above, a peripheral portion thereof constitutes a seal section, and a portion thereof, surrounded by the seal section, constitutes a current collecting section.

With the laminated body described as above, a conductor may be disposed between the flat plate and the slit plate. For the conductor, for example, a metal sheet, metal mesh, metallic porous body, and so forth are used. By so doing, bondability between the air pole and the slit section of the slit plate can be enhanced. As the constituent material of the conductor, use can be made of any material having conductivity, even in an oxidizing atmosphere at a high temperature. For example, a variety of heat-resistant alloys, such as a heat-resistant alloy containing chromium (for example, ferritic stainless steel), are cited.

Further, as a variation of the preferred embodiments of the invention, a cleavage may be provided in each of the plurality of the latticed strips forming the respective slits, and in such a manner as to run in the transverse direction of the respective slits, that is, in the direction crossing the longitudinal direction thereof. By so doing, the respective cleavages can cause the respective latticed strips to further warp under a load imposed from above in addition to warpage which the respective lattice strips have already undergone due to the load imposed from above, so that the bondability between the air pole and the slit section of the slit plate can be further enhanced. The cleavage for the respective latticed strips may be provided at the center thereof, in the longitudinal direction of the respective latticed strips (1), the cleavage for each of the latticed strips may be provided so as to be disposed at the upper end and lower end, alternately, of the latticed strips adjacent to each other, in the longitudinal direction thereof, respectively, that is, at the upper end and lower end of the latticed strips adjacent to each other, respectively, in a staggered manner (2), or the cleavage for each of the latticed strips may be provided so as to be disposed at any suitable position of every one of the latticed strips, in the longitudinal direction thereof, that is, at random for every one of the latticed strips (3).

An alloy (metal) has a thermal expansion coefficient higher in comparison than that of a ceramic. Accordingly, if a separator made of an alloy is used in a fuel cell, this will cause stress to occur due to variation in temperature, up and down, that is, thermal cycles, accompanying power generation and stoppage thereof, posing a problem of breakage occurring the fuel cell. With the invention, since the separator made of the alloy is divided between the flat plate and the slit plate, a stress applied to the cell due to the described thermal cycles can be alleviated by the flexibility of the separator, and in addition, the stress described can be further alleviated by providing the respective latticed strips of the slit plate with the cleavage or cleavages as described above.

Furthermore, with the laminated structure of the flat plate type solid oxide fuel cell according to the invention, a load can be divided, so that respective loads are imposed on the seal section, and the current collecting section, individually. Thus, since the respective loads are imposed on the seal section, and the current collecting section, individually, a stress that would occur if a load were evenly applied to the seal section and the current collecting section, as in the case of a conventional structure, can be alleviated, and yet a pressing force is applied to both the seal section and the current collecting section with certainty, so that it is possible to fabricate a high performance fuel cell stack wherein deterioration in performance does not occur, even if thermal cycles, that is, power generations and stoppages thereof, are repeated.

More specifically, in the slit plate, the respective latticed strips of the slit section, opposite to the current collecting section, are caused to warp downward under pressure of the load, imposed from above, so that by imposing the respective loads to the seal section and the current collecting section, individually, bondability between the air pole and the slit section of the slit plate can be further enhanced. In this respect, in the case of imposing a load evenly to the seal section and the current collecting section as with the case of the conventional structure (refer to FIG. 3), for example, adherence between the air pole and the slit section becomes insufficient although the seal section is densely stacked, thereby creating a factor for deterioration in the performance of the cell. However, by imposing the respective loads to the seal section and the current collecting section, individually, the stress is alleviated, and a pressing force is applied to both the seal section and the current collecting section with certainty, so that the current collecting section as well can be densely stacked.

With the invention, the solid oxide type fuel cell may be a holding film type cell for holding a fuel pole, wherein a metallic holding sheet joined to a thin-film electrolyte with sealant, and so forth, is disposed around an air pole. In this case as well, a current collecting layer, a current collector made up of a metal mesh, or the like may be disposed between the air pole and a slit plate. Further, in this case, instead of butting the slit plate against the air pole before butting the flat plate against the slit plate, the slit plate may be butted against the flat plate before butting the air pole against the slit plate.

The invention is applicable to a case of using a separator made of a heat resistant alloy such as a heat resistant alloy containing chromium. Examples of the heat resistant alloy as described include an alloy of a chemical composition where Cr=22 (unit: wt %, the same for all elements mentioned hereinafter), Mn=0.48, Si=0.36, Ni=0.26, Zr=0.22, Al=0.14, La=0.04, C=0.02, and Fe=balance, an alloy of a chemical composition where Cr=16.2 (unit: wt %, the same for all elements mentioned hereinafter), La=2.0, Si=0.95, Ni=0.12, Mn=0.09, C=0.03, and Fe=balance, or the like.

EXAMPLES

The invention will be described in more detail hereinafter with reference to examples, however, it is to be understood that the invention is not limited thereto.

Example 1

Figure 8:
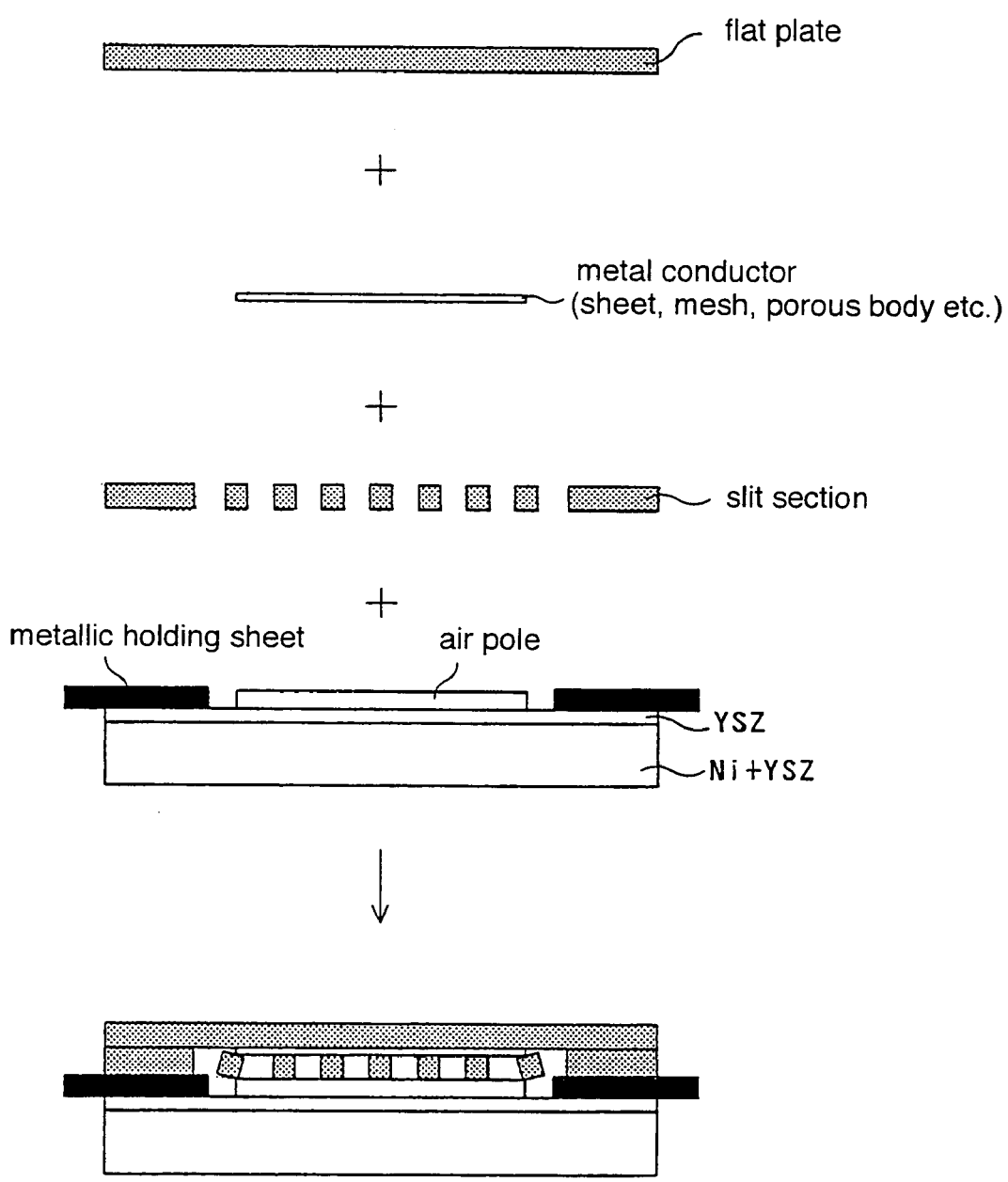
FIG. 8 is a schematic representation illustrating an example wherein a conductor; such as a metal sheet, metal mesh, metallic porous body, and so forth, is disposed between a flat plate and slit plate, according to Example 1.

FIG. 8 is a schematic representation illustrating an example wherein a conductor, such as a metal sheet, metal mesh, metallic porous body, and so forth, is disposed between a flat plate and a slit plate. As shown in FIG. 8, the conductor, such as the metal sheet, metal mesh, metallic porous body, and so forth, is disposed between the flat plate and slit plate. Because the slit plate can be caused to warp downward when the grooves thereof, that is, a plurality of latticed strips constituting slits, respectively are pressed from above, a slit section of the slit plate is pressed down due to the thickness of the conductor, so that bondability between an air pole and the slit plate can be enhanced.

Example 2

FIGS. 9 through 12 are schematic representations (plan views) illustrating examples wherein a cleavage is provided in each of a plurality of latticed strips constituting respective slits of a slit section of a slit plate. FIG. 9 shows an example where a cleavage is provided at the center of each of the latticed strips, in the longitudinal direction thereof. FIG. 10 shows another example where a cleavage for each of the latticed strips is provided so as to be disposed at the upper end and lower end, alternately, of the latticed strips adjacent to each other, in the longitudinal direction thereof, respectively, that is, at the upper end and lower end of the latticed strips adjacent to each other, respectively, in a staggered manner. FIGS. 11 and 12 show other examples, respectively, where a cleavage is provided at any suitable position of respective latticed strips, in the longitudinal direction thereof, for every latticed strip, that is, at random for every latticed strip. As a result, the respective cleavages can cause the respective latticed strips to further warp under a load imposed from above in addition to warpage which the respective latticed strips undergo due to the load imposed from above, so that the bondability between the air pole and the slit section of the slit plate can be further enhanced.

Example 3

Figure 13:
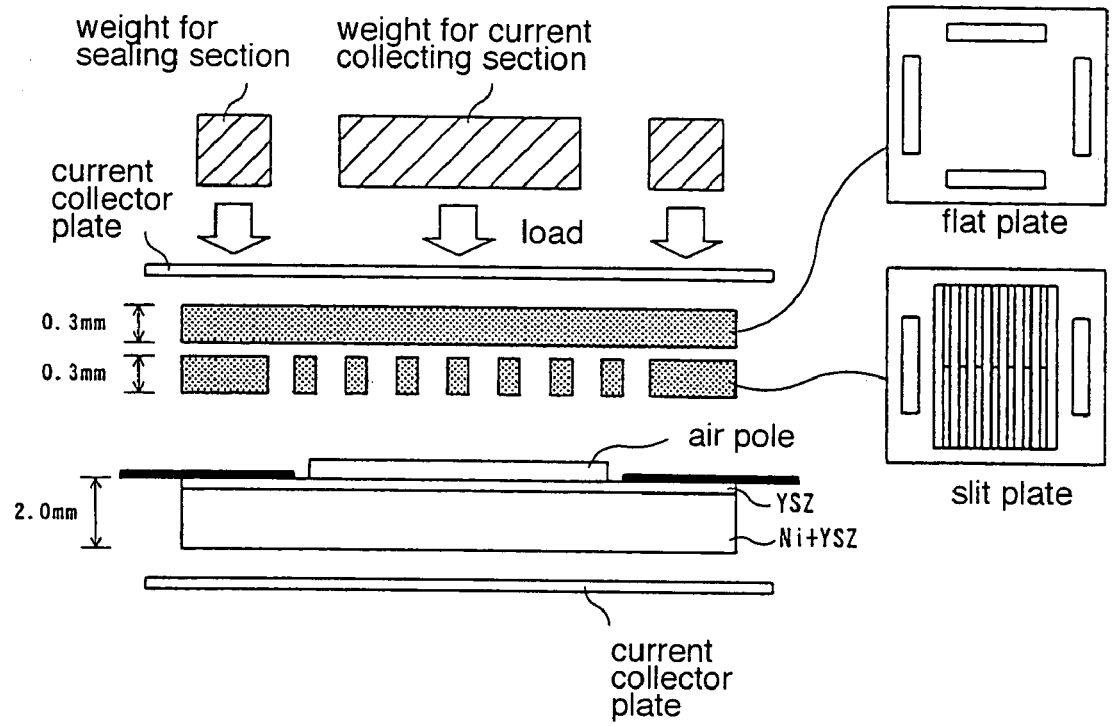
FIG. 13 is a schematic representation illustrating an example wherein respective loads are applied to a seal section and a current collecting section, individually, according to Example 3.
Figure 14:
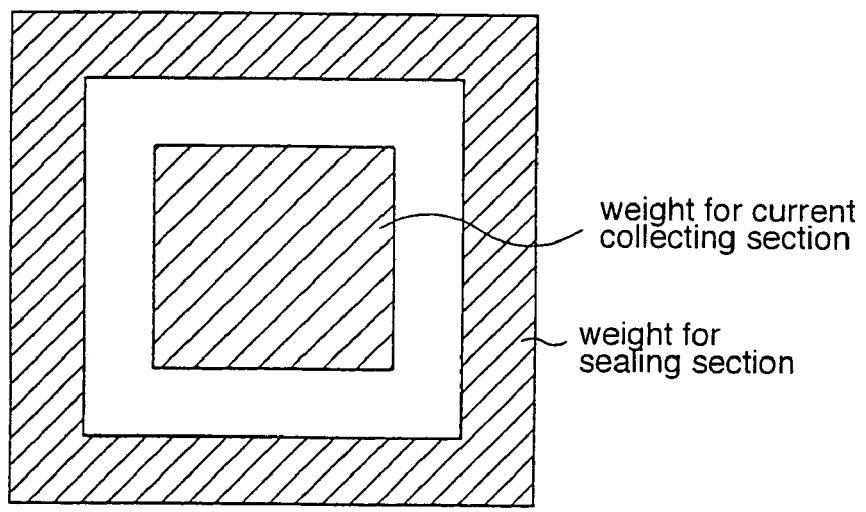
FIG. 14 is a top plan view of the example shown in FIG. 13, wherein the respective loads are applied to the seal section and the current collecting section, individually, according to Example 3.

The present example is an example of a laminated structure of a flat plate type solid oxide fuel cell using a separator comprising a flat plate and a slit plate, wherein a load is divided and respective loads are applied to a seal section and a current collecting section, individually. FIGS. 13 and 14 are schematic representations illustrating the present Example. FIG. 14 is a top plan view of weight portions shown in FIG. 13, as seen from above. As shown in FIGS. 13 and 14, respective weights are placed on top of the seal section and the current collecting section, individually. Since the respective loads are imposed on the seal section, and the current collecting section, individually, a stress that would occur if a load were evenly imposed on the seal section and the current collecting section, as in the conventional case, can be alleviated, and yet a pressing force can be applied to both the seal section and the current collecting section with certainty.

Figure 15:
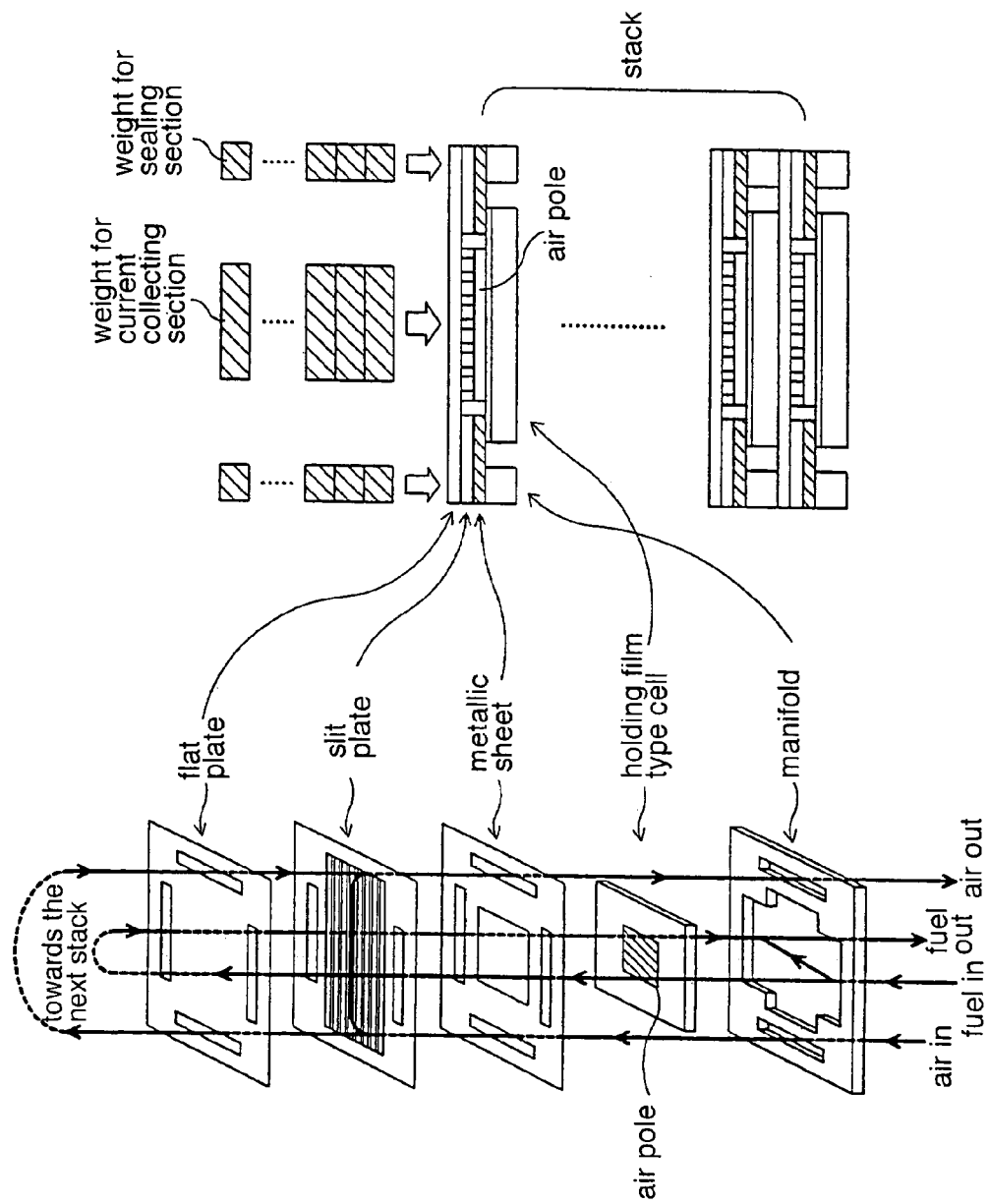
FIG. 15 is a schematic representation illustrating another example wherein respective loads are applied to a seal section and a current collecting section, individually, according to Example 3.

Apart from a load imposed on the seal section, a load is imposed on a fuel pole—an oxide electrolyte—an air pole—latticed strips—the flat plate, in the current collecting section, by a weight for the current collecting section, thereby causing the current collecting section to be densely stacked, without being affected by the load of the sealed section as stacked. Thus, it becomes possible to fabricate a high performance fuel cell stack wherein deterioration in performance does not occur, even if thermal cycles, that is, power generation and stoppage thereof, are repeated. FIG. 15 shows an example of a flat plate type solid oxide fuel cell stack made up by laminating a plurality of single cells with each other, and also shows a three-dimensional disposition relationship of respective members. By preparing a plurality of weights, each weighing as predetermined, and placing a required number thereof on the seal section and the current collecting section, respectively, it is possible to adjust the magnitude of a load weight imposed on the seal section and the current collecting section, individually.

Example 4

With the present example, there were prepared a plurality of sheets, each with the dimensions of 11 cm×11 cm (121 cm$^2$)×0.3 mm (thickness), made of a heat-resistant alloy containing chromium. The alloy was an alloy of the chemical composition where Cr=22 (unit: wt %, the same for all elements mentioned hereinafter), Mn=0.48, Si=0.36, Ni=0.26, Zr=0.22, Al=0.14, La=0.04, C=0.02, and Fe=balance. Then, using one of the sheets, the air feeding header/air exhausting header and the fuel feeding header/fuel exhausting header as shown in FIG. 5(A), were formed by punching, thereby forming a flat plate according to the invention.

Further, using another of the sheets, a plurality of slits and the fuel feeding header/fuel exhausting header/fuel exhausting header, as shown in FIG. 6(A), were formed by punching, thereby forming a slit plate according to the invention. The respective slits were formed between latticed strips, adjacent to each other. Meanwhile, for a fuel pole, a Ni–YSZ cermet was used, and for a solid oxide electrolytic material, YSZ (yttria-stabilized zirconia) was used. A fuel pole holding film type cell was formed by disposing the solid oxide electrolytic material on top of the fuel pole, and an air pole was disposed on top of a portion of the solid oxide electrolytic material, inside a frame of a thin metallic holding sheet in thickness (about 50 μm), thereby forming "an assembled body".

Subsequently, as shown in FIG. 7, the flat plate and slit plate, prepared as described above, were laminated to the assembled body. More specifically, after first disposing the slit plate on top of the assembled body, the flat plate was disposed. Thus, the current collecting function of the air pole and flow paths of air were provided by the combination of the single slit plate made of the alloy and the single flat plate made of the alloy, thereby constituting a flat type solid oxide fuel cell stack.

Figure 1:
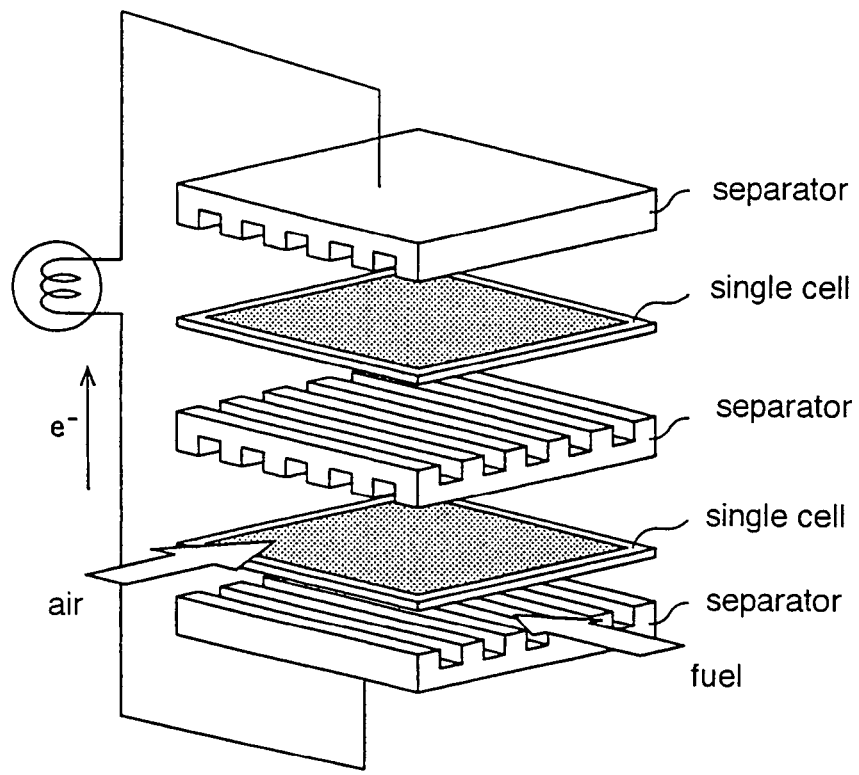
FIG. 1 is a schematic representation illustrating a form of a solid oxide type fuel cell by way of example.
Figure 2:
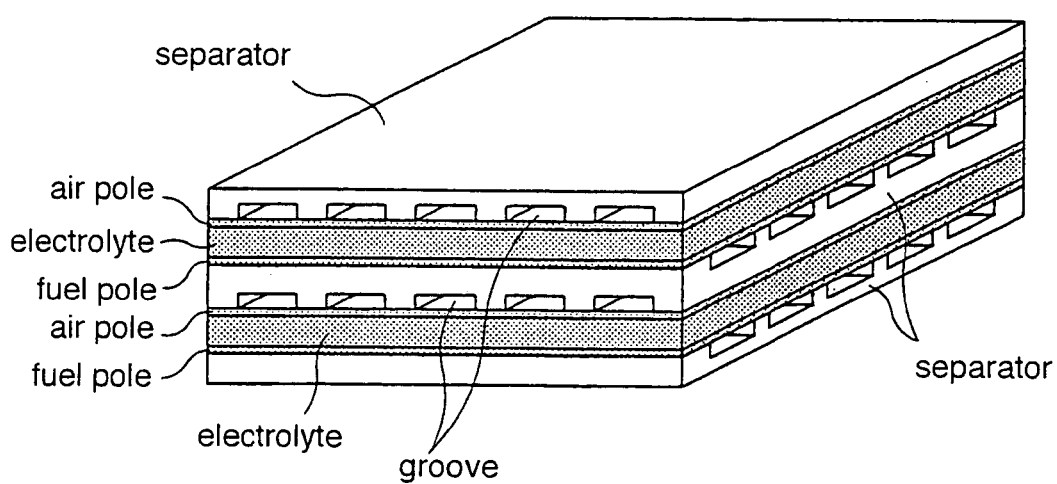
FIG. 2 is a schematic representation illustrating the form of the solid oxide type fuel cell by way of example.
Figure 3:
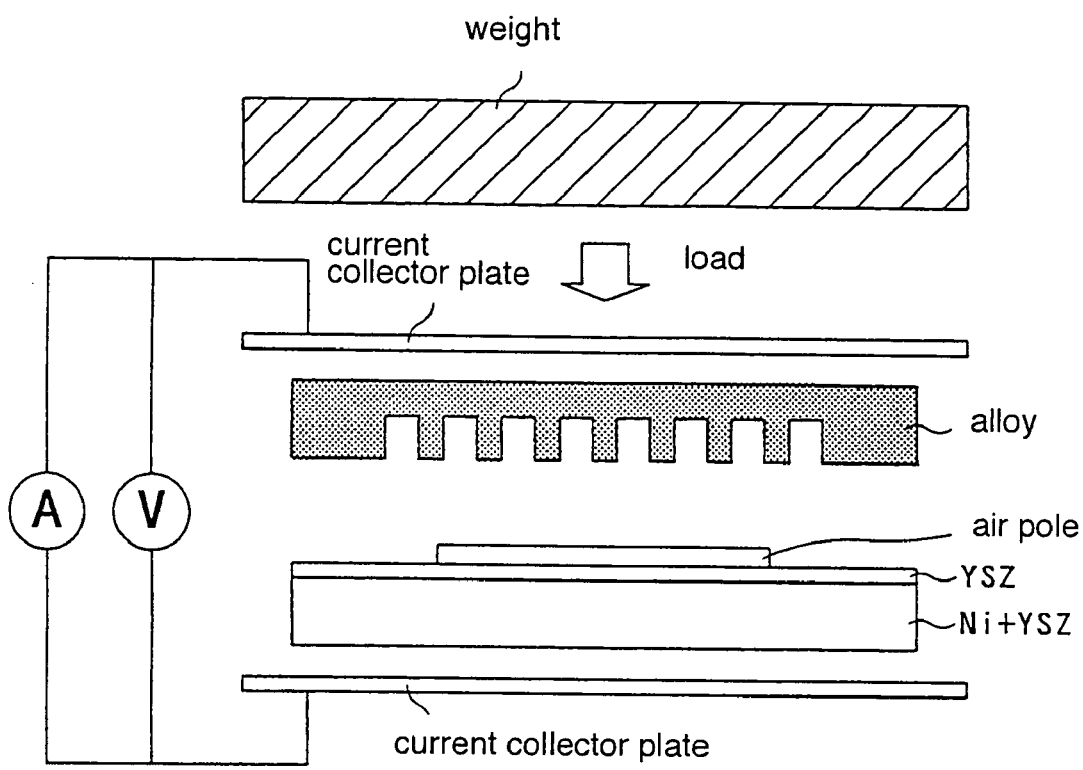
FIG. 3 is a schematic representation illustrating a process of constructing the solid oxide type fuel cell.
Figure 4:
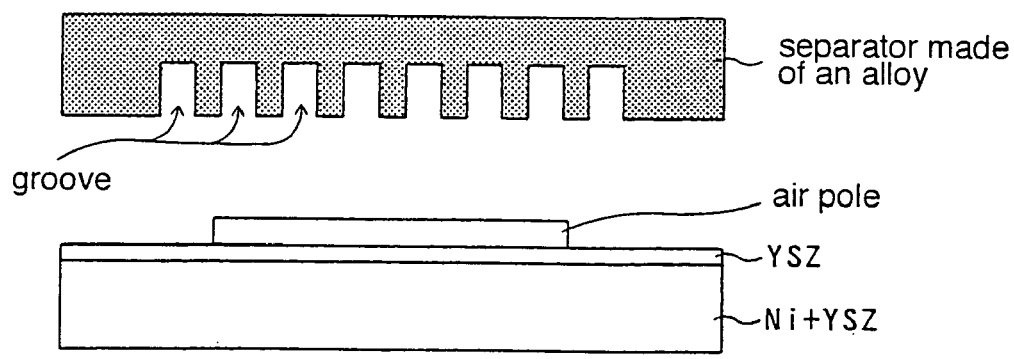
FIG. 4 is a schematic representation illustrating the construction of a conventional separator by way of example.

Power generation tests were conducted on the flat plate type solid oxide fuel cell stack. Using a testing apparatus, a current collector plate was disposed on the upper surface and underside surface of the stack, respectively, while an ammeter and a voltmeter were disposed between both the poles, as shown in FIG. 3, whereupon the fuel cell was put into operation to measure current and voltage. As a fuel gas to be fed to the fuel pole, 20% (mol %) humidified hydrogen was used, and air was fed to the air pole. The test results confirmed that the fuel cell has an excellent performance of 0.758 V in terms of output voltage with a current density of 0.3 A/cm$^2$ at 750° C.

Example 5

The present example is an example where a slit plate provided with cleavages was used and respective loads were imposed on a seal section and current collecting section, individually. A flat plate type solid oxide fuel cell stack was made up in the same way as for the case of Example 4, except that the slit plate provided with a cleavage at the center of each of latticed strips, in the longitudinal direction thereof, as shown in FIG. 9, was used for the slit plate, and respective loads were imposed on the seal section and the current collecting section, individually. Thereafter, power generation tests were conducted on the flat plate type solid oxide fuel cell stack. The test results confirmed that the obtained fuel cell has an excellent performance of 0.766 V in terms of output voltage with a current density of 0.3 A/cm$^2$ at 750° C.

The invention has advantageous effects in that not only a problem with the processing of the separator made of an alloy, for use in the flat plate type solid oxide fuel cell, can be eliminated but also the flat plate type solid oxide fuel cell using the separator can maintain an excellent performance as the flat plate type solid oxide fuel cell.

What is claimed is:

1. A laminated flat plate solid oxide fuel cell comprising a separator made of an alloy and comprising a flat plate and a slit plate, an air pole butted against the slit plate, a metallic holding sheet disposed around the air pole and a thin film electrolyte joined to the metallic holding sheet by a sealant.

2. The laminated flat plate solid oxide fuel cell of claim 1, wherein a conductor is disposed between the flat plate and the slit plate.

3. The laminated flat plate solid oxide fuel cell of claim 1, wherein a current collecting layer or a current collector made up of a metal mesh is disposed between the air pole and the slit plate.

4. The laminated flat plate solid oxide fuel cell of claim 1, wherein the separator is made of a heat-resistant alloy containing chromium.

5. The laminated flat plate solid oxide fuel cell of claim 1, wherein said fuel cell is a holding film cell for holding a fuel pole and an electrolytic film is formed on a substrate of the fuel pole.

6. The laminated flat plate solid oxide fuel cell of claim 1, additionally comprising respective loads imposed on a seal section and a current collecting section, individually.

7. The laminated flat plate oxide fuel cell of claim 1, wherein the sealant is a glass or a wax.

8. A laminated flat plate solid oxide fuel cell, comprising a separator made of an alloy and comprising a flat plate and a slit plate, and an air pole butted against the slit plate, the slit plate comprising respective latticed strips having a cleavage therein which form slits that run in a direction crossing the longitudinal direction of the latticed strips.

9. The laminated flat plate solid oxide fuel cell of claim 8, wherein the cleavage is provided at the center of the respective latticed strips, in the longitudinal direction thereof.

10. The laminated flat plate solid oxide fuel cell of claim 8, wherein the cleavage is provided so as to be disposed at the upper end and lower end, alternately, of the latticed strips adjacent to each other, in the longitudinal direction thereof, respectively.

11. The laminated flat plate solid oxide fuel cell claim 8, wherein the cleavage is provided at any suitable position, in the longitudinal direction thereof, for every latticed strip.

12. A separator made of an alloy and used in a flat plate solid oxide fuel cell, said separator comprising a flat plate and a slit plate, the slit plate comprising respective latticed strips having a cleavage therein which form slits that run in a direction crossing the longitudinal direction of the latticed strips.

13. The separator of claim 12, wherein the separator is made of a heat-resistant alloy containing chromium.

14. The separator of claim 12, wherein the cleavage is provided at the center of the respective latticed strips, in the longitudinal direction thereof.

15. The separator of claim 12, wherein the cleavage is provided at the upper end or lower end of every other latticed strip, alternately, in the longitudinal direction thereof, for the respective latticed strips adjacent to each other.

16. The separator of claim 12, wherein the cleavage is a provided at any suitable position, in the longitudinal direction thereof, for every latticed strip.

* * * * *